(12) United States Patent
Iwakabe et al.

(10) Patent No.: US 11,630,351 B2
(45) Date of Patent: Apr. 18, 2023

(54) LIQUID CRYSTAL PANEL AND ELECTRO-OPTICAL DEVICE

(71) Applicant: Japan Display Inc., Tokyo (JP)

(72) Inventors: Yasushi Iwakabe, Tokyo (JP); Nobuko Fukuoka, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/125,025

(22) Filed: Dec. 17, 2020

(65) Prior Publication Data

US 2021/0103168 A1 Apr. 8, 2021

Related U.S. Application Data

(63) Continuation of application No. PCT/JP2019/020974, filed on May 27, 2019.

(30) Foreign Application Priority Data

Jun. 22, 2018 (JP) .............................. JP2018-118813

(51) Int. Cl.
*G02F 1/1339* (2006.01)
*C08L 33/08* (2006.01)
*C08L 63/00* (2006.01)
*G02F 1/1368* (2006.01)

(52) U.S. Cl.
CPC ............ *G02F 1/1339* (2013.01); *C08L 33/08* (2013.01); *C08L 63/00* (2013.01); *G02F 1/1368* (2013.01)

(58) Field of Classification Search
CPC ...... G02F 1/1339; G02F 1/1368; C08L 33/08; C08L 63/00
See application file for complete search history.

(56) References Cited

U.S. PATENT DOCUMENTS

| | | |
|---|---|---|
| 6,452,650 B1 | 9/2002 | Nakao et al. |
| 2002/0113753 A1 | 8/2002 | Sullivan et al. |
| 2014/0071389 A1 | 3/2014 | Daishi et al. |
| 2014/0213137 A1 | 7/2014 | Miyake et al. |
| 2016/0355734 A1 | 12/2016 | Zhou et al. |

(Continued)

FOREIGN PATENT DOCUMENTS

| | | |
|---|---|---|
| CN | 101819357 A | 9/2010 |
| JP | 2004-279983 A | 10/2004 |
| JP | 2007-187866 A | 7/2007 |

(Continued)

OTHER PUBLICATIONS

International Search Report dated Sep. 7, 2019 for the PCT Application No. PCT/JP2019/020974, with English machine translation.

(Continued)

*Primary Examiner* — James A Dudek
(74) *Attorney, Agent, or Firm* — Michael Best & Friedrich LLP

(57) ABSTRACT

A liquid crystal panel according to one embodiment includes a first substrate, a second substrate opposed to the first substrate, a sealing member bonding the first substrate and the second substrate, and a liquid crystal layer sealed between the first substrate and the second substrate by the sealing member. The sealing member includes a ten-hour half-life temperature of 95° C. or lower and an acrylic resin. The liquid crystal layer includes a macromolecular compound.

12 Claims, 5 Drawing Sheets

(56) References Cited

U.S. PATENT DOCUMENTS

2017/0219860 A1  8/2017  Ono et al.
2017/0269433 A1  9/2017  Sugiyama et al.

FOREIGN PATENT DOCUMENTS

| | | |
|---|---|---|
| JP | 2010-132801 A | 6/2010 |
| JP | 2011-197654 A | 10/2011 |
| JP | 2016-206474 A | 12/2016 |
| JP | 2017-063038 A | 3/2017 |
| JP | 2017-198740 A | 11/2017 |
| JP | 2017-223828 A | 12/2017 |
| JP | 2018-035291 A | 3/2018 |
| WO | 2016-056560 A1 | 4/2016 |

OTHER PUBLICATIONS

Japanese Office Action dated Jun. 21, 2022, for the Japanese Patent Application No. 2018-118813, with Global Dossier English translation.

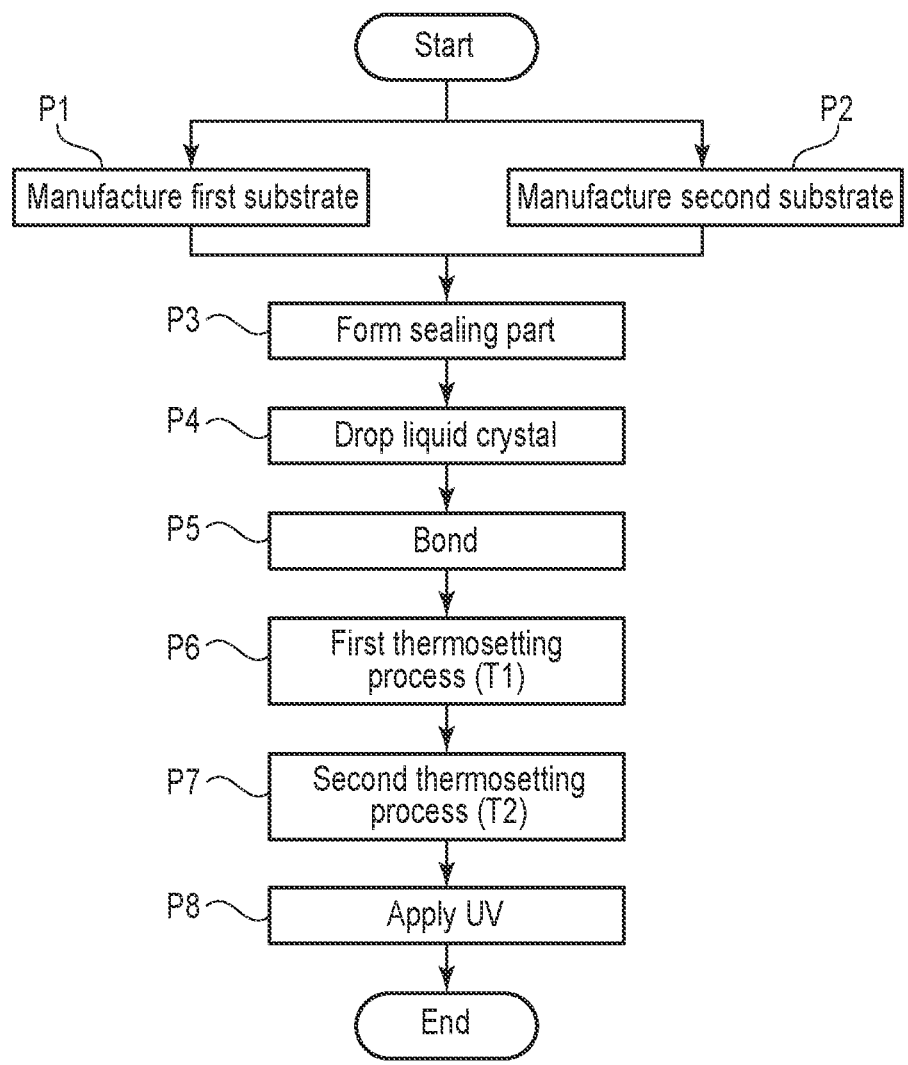
F I G. 5

LIQUID CRYSTAL PANEL AND ELECTRO-OPTICAL DEVICE

CROSS-REFERENCE TO RELATED APPLICATIONS

This application is a Continuation Application of PCT Application. No. PCT/JP2019/020974 filed May 27, 2019 and based upon and claiming the benefit of priority from Japanese Patent Application No. 2018-118813, filed. Jun. 22, 2018, the entire contents of all of which are incorporated herein by reference.

FIELD

Embodiments described herein relate generally to a liquid crystal panel and an electro-optical device.

BACKGROUND

Electro-optical devices such as liquid crystal display devices comprises liquid crystal panels. For example, the liquid crystal panel comprises a first substrate, a second substrate, a sealing member that bonds the first substrate and the second substrate, and a liquid crystal layer sealed inside the sealing member between the first substrate and the second substrate. In addition, recently, a liquid crystal panel comprising a scattering liquid crystal layer capable of changing a scattering state of scattering the light and a transmissive state of making the light transmitted has been developed.

As a method of providing the liquid crystal layer inside the sealing member, vacuum injection and drop injection (ODF) are known. In the vacuum injection, an inlet is provided at the sealing member and, the liquid crystal material is injected from the inlet after the sealing member is cured. In the ODF, the sealing member containing an ultraviolet curing material is drawn on one of a pair of substrates, and the liquid crystal material is dropped to the inside thereof. After that, the sealing member is cured by being irradiated with, for example, ultraviolet light.

Suppression of application of ultraviolet light to a region other than the sealing member may be desirable according to the type of the liquid crystal panel. In this case, improvement to cure the sealing member is required. For example, the liquid crystal monomer is polymerized by applying ultraviolet light to the liquid crystal layer when the liquid crystal panel comprising the above-described scattering liquid crystal layer is manufactured. When ultraviolet light is applied to the liquid crystal layer to cure the sealing member, the liquid crystal monomer may be polymerized undesirably.

BRIEF DESCRIPTION OF THE DRAWINGS

FIG. 5 is a flowchart showing an example of a method of manufacturing the display device according to the embodiment.

DETAILED DESCRIPTION

Figure 1:
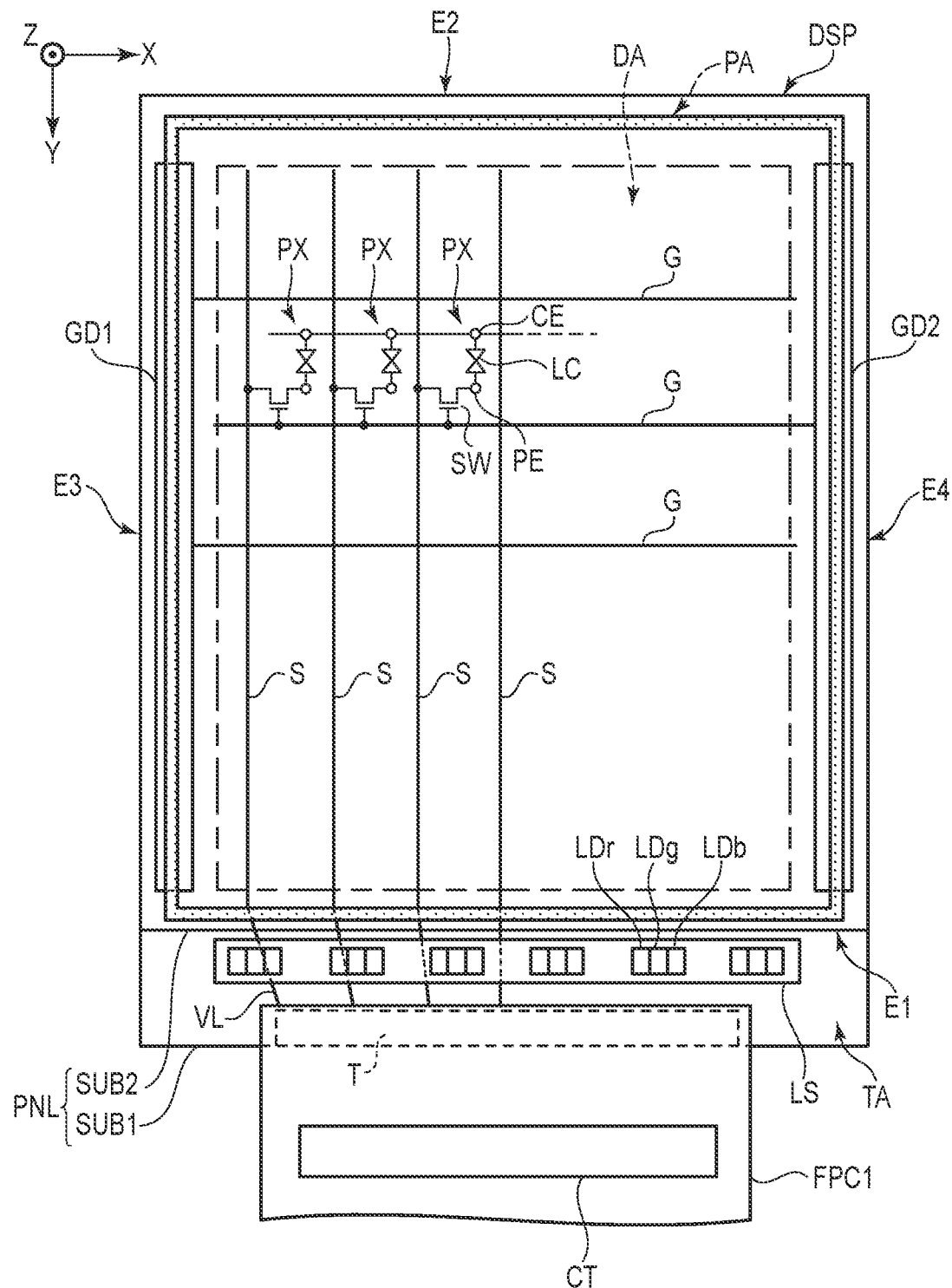
FIG. 1 is a plan view showing a configuration example of a display device (electro-optical device) according to one of the embodiments.

In general, according to one embodiment, a liquid crystal panel comprises: a first substrate; a second substrate opposed to the first substrate; a sealing member bonding the first substrate and the second substrate, a liquid crystal layer sealed between the first substrate and the second substrate by the sealing member. The sealing member contains a thermal radical polymerization initiator and an acrylic resin, the thermal radical polymerization initiator has a ten-hour half-Life temperature of 95° C. or lower. The liquid crystal layer contains a macromolecular compound.

According to another embodiment, a liquid crystal panel comprises: a first substrate; a second substrate opposed to the first substrate; a sealing member bonding the first substrate and the second substrate, a liquid crystal layer sealed between the first substrate and the second substrate by the sealing member. The sealing member contains an acrylic resin, and a thermal radical polymerization initiator which has a peroxyester skeleton or which is an azo-based polymer having a number average molar mass of 1,000 or more. The liquid crystal layer contains a macromolecular compound.

According to yet another embodiment, an electro-optical device comprises the liquid crystal panel and allows one side of the liquid crystal panel to be visually recognized from the other side.

According to such a structure, the liquid crystal panel capable of suitably curing the sealing member and the electro-optical device comprising the liquid crystal panel can be provided.

One of embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the present specification, expressions such as "α includes A, B, Cr C", "α includes any one of A, B, and C" and "α includes an element selected from a group consisting of A, B, and C" do not exclude a case where α includes a plurality of combinations of A to C unless otherwise specified. Furthermore, these expressions do not exclude a case where a includes other elements.

In the expression "first α, second α, and third α" of the present specification, "first, second, and third" are convenient numbers used to explain the elements. In other words, an expression "A comprises third α" may indicate a case that A does not comprise first α and second α other than third α, unless otherwise specified.

In the present specification, expressions "member β on member α" and "member β under member α" may simply not only a case where the member α and the member β are in contact with each other, but also a case where the other member is interposed between the member α and the member β.

In each embodiment, a liquid crystal display device is disclosed as an example of the electro-optical device. In addition, a liquid crystal panel which the liquid crystal display device comprises is disclosed as an example of the liquid crystal panel. However, each embodiment does not prevent application of individual technical ideas disclosed in each embodiment to other types of display devices. As the other types of electro-optical devices, for example, a self-luminous display device such as a light-emitting diode or an organic electroluminescent display device, an electronic paper display device comprising an electrophoretic element, a display device employing the micro-electromechanical systems (MEMS), a display device employing the electrochromism, and the like are assumed. In addition, the electro-optical device may be a device other than a display device such as a screen device capable of changing a state in which a background of the panel is transparently visible and a state in which the background is invisible under electric control.

FIG. 1 is a plan view showing a configuration example of a liquid crystal display device DSP (hereinafter referred to as a display device DSP) according to the embodiment. In the figure, a first direction X, a second direction Y and a third direction Z intersect each other. For example, the first direction X, the second direction Y, and the third direction Z are orthogonal to each other but may intersect at an angle other than 90 degrees.

The display device DSP comprises a liquid crystal panel PNL, a light source LS, a first flexible printed circuit FPC1, and a controller CT. The liquid crystal panel PNL comprises a first substrate SUB1 (array substrate), a second substrate SUB2 (counter-substrate), a scattering liquid crystal layer LC sealed between these substrates.

In the example of FIG. 1, the liquid crystal panel PNL has a first side E1, a second side P2, a third side E3, and a fourth side E4. For example, the first side E1 and the second side E2 are parallel to the first direction X, and the third side P3 and the fourth side P4 are parallel to the second direction. Y. In the embodiment, the sides E1 to P4 correspond to four sides of the rectangular second substrate SUB2. The first substrate SUB1 also has a rectangular shape, and its three sides are overlaid on the sides E2 to P4, respectively. The lower side of the first substrate SUB1 in the figure protrudes from the first side E1. A portion of the first substrate SUB1 which protrudes from the second substrate SUB2 is a terminal area TA and includes a terminal T for external connection. The first flexible printed circuit FPC1 is connected to the terminal T. Incidentally, the shape of the first substrate SUB1 and the second substrate SUB2 is not limited to the rectangular shape.

The liquid crystal panel PNL includes a display area DA on which an image is displayed and a peripheral area PA located around the display area DA. The display area DA is an example of the electro-optical area. The peripheral area PA includes the terminal area TA. In the display area DA, the first substrate SUB1 comprises a plurality of scanning signal lines G and a plurality of video signal lines S. The plurality of scanning signal lines G extend in the first direction X and are arranged in the second direction Y. The plurality of video signal lines S extend in the second direction Y and are arranged in the first direction X.

The display area DA includes a plurality of pixels PX arrayed in a matrix. The first substrate SUB1 comprises a pixel electrode PE and a switching element SW arranged in each of the pixels PX. The second substrate SUB2 comprises a common electrode CE extending across the plurality of pixels PX. A common voltage is supplied to the common electrode CE.

The liquid crystal panel PNL comprises a first scanning line driver GD1 and a second scanning line driver GD2, in the peripheral area PA. In the example of FIG. 1, the first scanning line driver GD1 is arranged between the display area DA and the third side E3, and the second scanning line driver GD2 is arranged between the display area DA and the fourth side P4. The scanning signal lines G extend to the peripheral area PA to be connected to the first scanning line driver GD1 or the second scanning line driver GD2. The video signal lines S are connected to the terminal T via lines VL provided in the peripheral area PA. The first scanning line driver GD1 and the second scanning line driver GD2 control each of the switching elements SW via each of the scanning signal lines G.

The light source LS is arranged in the terminal area TA. The light source LS comprises a plurality of light emitting elements LD opposed to the first side E1. In the embodiment, the plurality of light emitting elements LD include light emitting elements LDr emitting red light, light emitting elements LDg emitting Green light, and light emitting element LDb emitting blue light. However, the light source LS may comprise light emitting elements LD emitting colors other than red, green, and blue. In FIG. 1, the light emitting elements LDr, LDg, and LDb are arranged in the first direction X for convenience. However, the light emitting elements LDr, LDg, and LDb may be arranged in the third direction Z. Incidentally, the light sources LS may be opposed on the second side E2, the third side E3 or the fourth side E4. A plurality of opposed light sources LS may be arranged on different sides, respectively.

The controller CT controls the first scanning line driver GD1, the second scanning line driver GD2, and the light source LS, and supplies video signals to the respective video signal lines S. In the example shown in FIG. 1, the controller CT is mounted on the first flexible printed circuit FPC1. However, the controller CT may be mounted on the other member.

Figure 2:
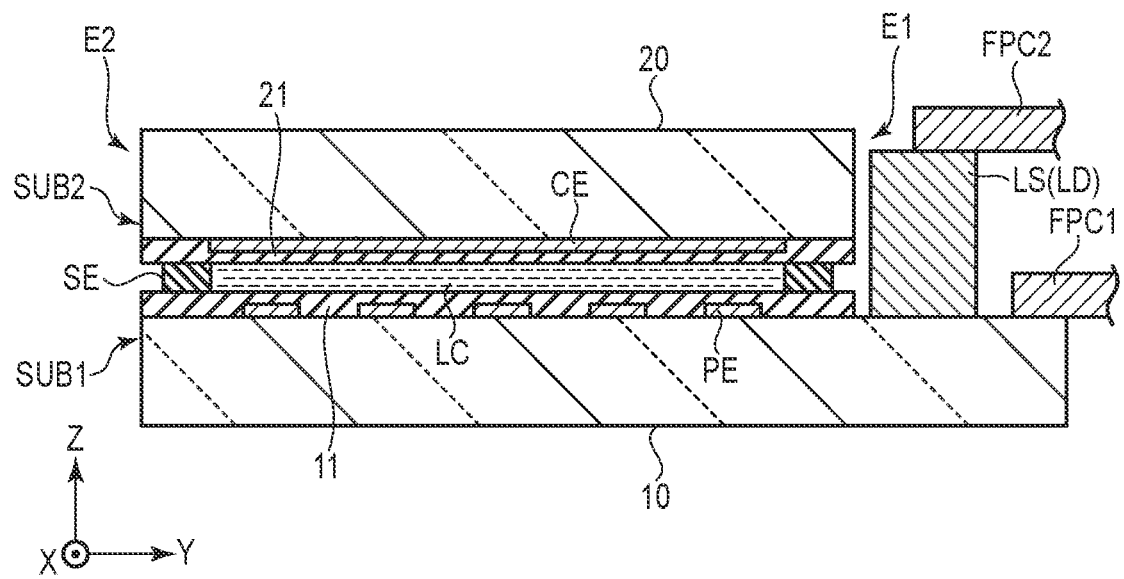
FIG. 2 is a schematic cross-sectional view showing the display device according to the embodiment.

FIG. 2 a schematically cross-sectional view showing the display device DSP shown in FIG. 1. Main portions alone in the cross-section of the display device DSP in a Y-Z plane defined by the second direction Y and the third direction Z will be described here.

The light source LS (light emitting element ID) is opposed to a side surface of the second substrate SUB2, on the first side E1. When the light sources IS are arranged along the other sides E3 to E4, the light sources IS may be opposed to both the first substrate SUB1 and the second substrate SUB2 or may be opposed to either of them. For example, the second flexible printed circuit FPC2 is connected to the light source LS. For example, the second flexible printed circuit FPC2 is also connected to the above-described controller CT.

The first substrate SUB1 comprises a first transparent base 10, pixel electrodes PE, and a first alignment film 11 covering the pixel electrode PE. The second substrate SUB2 comprises a second transparent base 20, a common electrode CE, and a second alignment film 21 covering the common electrode CE. The first substrate SUB1 and the second substrate SUB2 are bonded to each other by a sealing member SE. The liquid crystal layer LC is arranged in space surrounded by the first alignment film 11 and the second alignment film 21.

The pixel electrodes PB and the common electrode CE can be formed of, for example, a transparent conductive material such as indium tin oxide (IT)). The first alignment film 11 and the second alignment film 21 can be formed of, for example, polyimide. The first alignment film 11 and the second alignment film 21 have an alignment restriction force that allows liquid crystal molecules contained in the liquid crystal layer LC to be aligned in the initial alignment direction. The alignment restriction force can be imparted by, for example, a rubbing process but may be imparted by the other method such as an optical alignment.

Figure 3A:
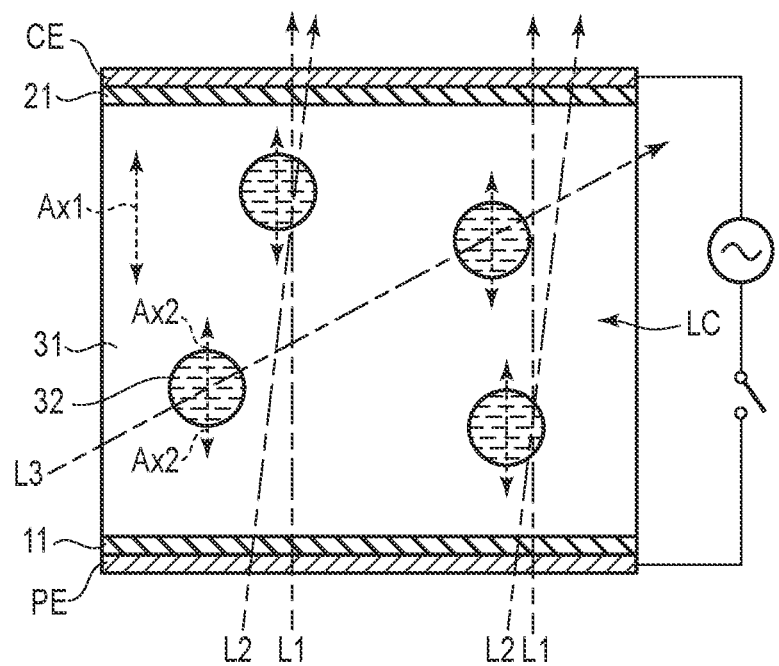
FIG. 3A is a cross-sectional view showing an example of the structure applicable to a liquid crystal layer according to the embodiment.
Figure 3B:
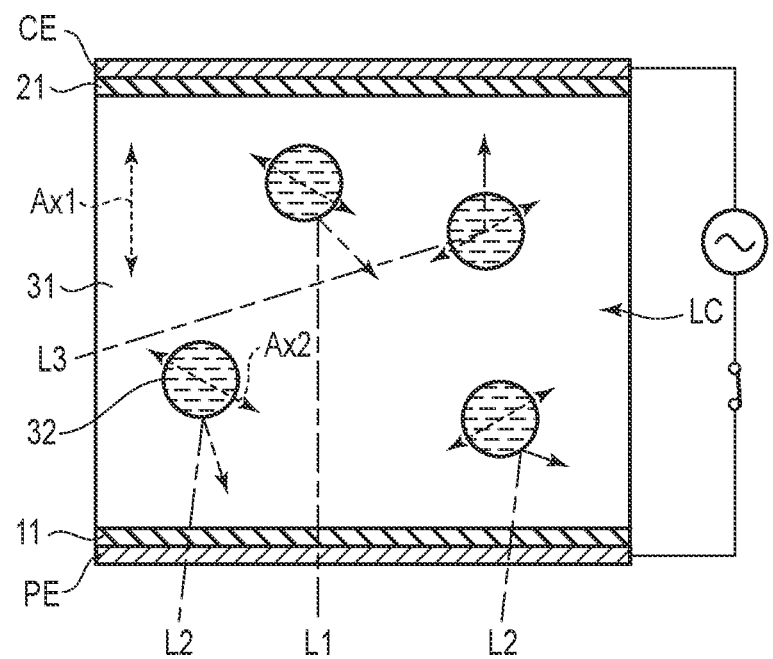
FIG. 3B is a cross-sectional view showing an example of the structure applicable to a liquid crystal layer according to the embodiment.

FIGS. 3A and 3B are cross-sectional views showing an example of the structure applicable to the liquid crystal layer LC. The liquid crystal layer LC contains a liquid crystal polymer 31 that is an example of a macromolecular compound, and liquid crystal molecules 32. For example, the liquid crystal monomer is polymerized in a state of being aligned in the initial alignment direction by the alignment restriction force of the first alignment film 11 and the second alignment film 21, and the liquid crystal polymer 31 is thereby obtained. The liquid crystal molecules 32 are dispersed in the liquid crystal monomer and are aligned in a predetermined direction depending on the alignment direction of the liquid crystal monomer when the liquid crystal monomer is polymerized.

The liquid crystal molecules 32 may be positive molecules having a positive dielectric anisotropy or negative molecules having a negative dielectric anisotropy. The liquid crystal polymer 31 and the liquid crystal molecules 32 have equivalent optical anisotropy. Alternatively, the liquid crystal polymer 31 and the liquid crystal molecules 32 have substantially equivalent refractive anisotropy. In addition, the liquid crystal polymer 31 and the liquid crystal molecules 32 are different in the response to the electric field. That is, the response of the liquid crystal polymer 31 to the electric field is lower than the response of the liquid crystal molecules 32 to the electric field.

The example shown in FIG. 3A corresponds to, for example, a state in which no voltage is applied to the liquid crystal layer IC (i.e., a state in which a potential difference between the pixel electrode PE and the common electrode CE is zero). In this state, an optical axis Ax1 of the liquid crystal polymer 31 and an optical axis Ax2 of the liquid crystal molecules 32 are parallel to each other.

As described above, the liquid crystal polymer 31 and the liquid crystal molecules 32 have substantially equivalent refractive anisotropy, and the optical axes Ax1 and Ax2 are parallel to each other. For this reason, the liquid crystal polymer 31 and the liquid crystal molecules 32 are hardly different in refractive index in all directions including the first direction X, the second direction Y, and the third direction Z. Thus, most of a light beam L1 parallel to the third direction Z and light beams 12 and 13 angled to the third direction Z are transmitted through the liquid crystal layer IC without being scattered.

The example shown in FIG. 3B corresponds to a scattering state in which a voltage is applied to the liquid crystal layer IC (i.e., a state in which a potential difference is formed between the pixel electrode PE and the common electrode CE). As described above, the response of the liquid crystal polymer 31 to the electric field is lower than the response of the liquid crystal molecules 32 to the electric field. For this reason, in the state in which a voltage is applied to the liquid crystal layer LC, the alignment direction of the liquid crystal molecules 32 is changed in accordance with the electric field while the alignment direction of the liquid crystal polymer 31 is hardly changed. The optical axis Ax2 is therefore angled to the optical axis Ax1. A large refractive index difference is thereby generated between the liquid crystal polymer 31 and the liquid crystal molecules 32 in all the directions including the first direction X, the second direction Y, and the third direction Z in this state, the light beams L1 to L3 incident on the liquid crystal layer LC are scattered in the liquid crystal layer LC.

Incidentally, the structure of the liquid crystal layer LC is not limited to the example described above. For example, the liquid crystal layer LC may contain a macromolecular compound of a linear cross-section having an alignment restriction force and liquid crystal molecules aligned by the macromolecular compound and be configured to be a scattering state by applying a voltage to the liquid crystal layer LC. That is, the liquid crystal layer LC of the embodiment may have any structure if configured to use a liquid crystal composition capable of changing the transmissive state and the scattering state by an electric field formed between the pixel electrode PE and the common electrode CE.

Figure 4:
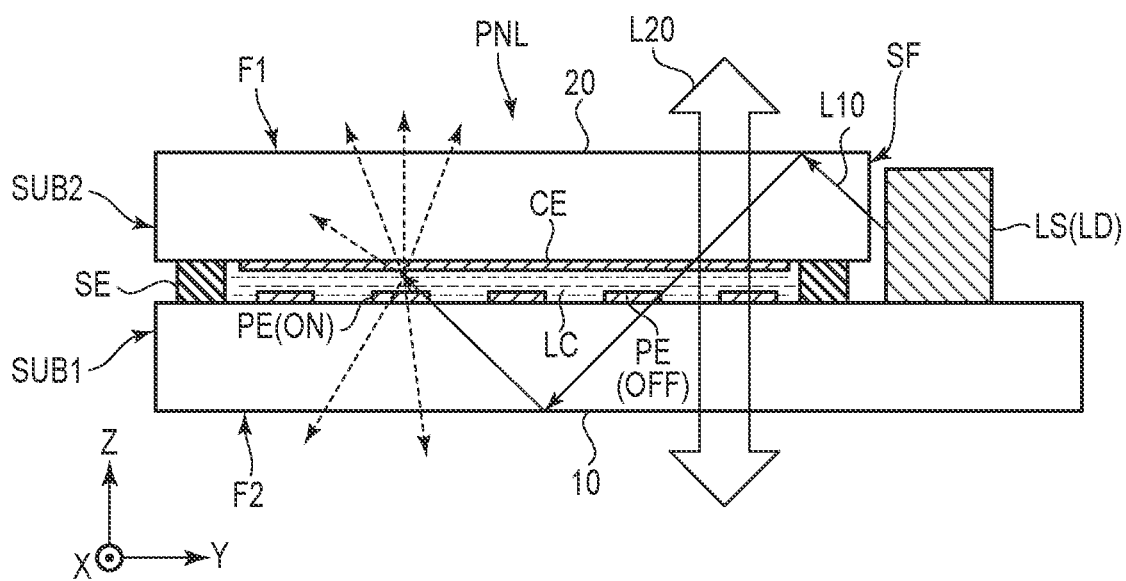
FIG. 4 is a cross-sectional view illustrating image display of the liquid crystal panel according to the embodiment.

FIG. 4 is a cross-sectional view of the liquid crystal panel PNL, illustrating image display using the light beam from the light source LS. A light beam L10 emitted from the light source LS is made incident from a side surface SF of the second transparent base 20 to propagate through the second transparent base 20, the liquid crystal layer LC, the first transparent base 10, and the like. The light beam L10 is hardly scattered in the liquid crystal layer LC near the pixel electrode PE (OFF in the figure) to which no voltage is applied. For this reason, the light beam L10 hardly leaks from a first surface F1 (i.e., the upper surface of the second transparent base 20) and a second surface F2 (i.e., the lower surface of the first transparent base 10) of the liquid crystal panel PCL.

In contrast, the light beam 110 is scattered in the liquid crystal layer IC near the pixel electrode PE (ON in the figure) to which a voltage is applied. This scattered light is emitted from the first surface F1 and the second surface F2 and is visually recognized as a display image.

Incidentally, an external light beam 120 made incident on the first surface F1 or the second surface F2 near the pixel electrode PE (OFF in the figure) to which no voltage is applied is transmitted through the liquid crystal panel PCI without being substantially scattered. That is, the background on the first surface Cl side can be visually recognized when the liquid crystal panel PCI is viewed from the second surface F2 side, and the background of the second surface F2 can be visually recognized when the liquid crystal panel PNL is viewed from the first surface F1. The image using the light beam L10 from the light source LS is displayed as if it floated on the background.

The display device DSP configured as described above can be driven in, for example, the field sequential system. In this system, one frame period includes a plurality of sub-frame periods (fields). For example, when the light emitting elements include red, green, and blue light emitting elements LDr, LDg, and LDb, similarly to the embodiment, red, green, and blue sub-frame periods are included in one frame period.

In the red sub-frame period, the light emitting element LDr illuminates and each pixel PX is controlled in accordance with red image data. A red image is thereby displayed. In the green and blue sub-frame periods, too, the light emitting elements LDg and LDb illuminate and each pixel PX is controlled in accordance with green and blue image data. Green and blue images are thereby displayed. The images of red, green, and blue colors thus displayed in time division are synthesized with each other and visually recognized as multi-color display images by the user.

Next, a method of manufacturing the display device DSP will be described. When the scattering type liquid crystal layer LC similar to the embodiment is manufactured, the liquid crystal monomer is polymerized by applying ultraviolet light to the liquid crystal layer in a state where the first alignment film 11 and the second alignment film 21 are aligned by the alignment restriction force. Examples of a method of injecting the liquid crystal layer IC into the inside of the sealing member SE include a vacuum injection method and a drop injection (ODF) method. In the vacuum injection method, an inlet is provided in the sealing member SE, and a liquid crystal material is injected from the inlet after the sealing member SE is cured.

Since a liquid crystal material containing a liquid crystal monomer has a high viscosity, similarly to the embodiment, injection in the vacuum injection method takes much time. In addition, the liquid crystal material may enter the gap between the first substrate SUB1 and the second substrate SUB2 outside the sealing member SE, in the vicinity of the inlet, due to a capillary phenomenon. The liquid crystal material thus entering the outside of the sealing member SE may be polymerized upon application of ultraviolet light and may hinder the transmission of light from the light source LS.

In the ODF method, the sealing member SE is formed (drawn) on one of the first substrate SUB1 and the second substrate SUB2, and the liquid crystal material is dropped inside the sealing member SE. In general, an ultraviolet curing material is used for the sealing member SE, and the sealing member SE is cured by application of ultraviolet light. In the ODF method, unlike the vacuum injection method, injection of the liquid crystal material does not take much time or the liquid crystal material does not enter the outside of the sealing member SE. However, when the sealing member SE is cured by the ultraviolet light, the liquid crystal monomer is polymerized by receiving the ultraviolet light.

Thus, in the embodiment, the ODF method is employed and the sealing member SE is cured by heat instead of ultraviolet light. In order to adapt to such a manufacturing method, the sealing member SE in the present embodiment contains an acrylic resin, an epoxy resin, a thermal radical polymerization initiator, and a thermosetting agent. In addition, the liquid crystal layer LC contains the above-described macromolecular compound. Desirably, the liquid crystal layer LC contains a photo-radical polymer nation initiator and a polymerization inhibitor.

The acrylic resin is a curable composition containing a compound having a (meta) acryloyl group. In addition, the epoxy resin is a curable composition containing a compound having an epoxy group. The sealing member SE may contain epoxy acrylate together with epoxy resin or instead of epoxy resin.

Aspects of a thermal radical polymerization initiator, a thermosetting agent, a photo-radical polymerization initiator and a polymerization inhibitor will be described below.

[Thermal Radical Polymerization Initiator]

The thermal radical polymerization initiator contained in the seal portion SE is heated and thereby initiates radical polymerization in the uncured acrylic resin. For example, the thermal radical polymerization initiator composed of an azo compound or an organic peroxide can be used. These can generate radicals under low temperature conditions. More specifically, polymeric azo initiator composed of a polymeric azo compound may be used as the thermal radical polymerization initiator. For example, the polymeric azo initiator means a compound having an azo group, having a number average molar mass of 300 or more, and generating a radical capable of curing an acryloyloxin group by heat. One type of the thermal radical polymerization initiator may be used alone, but two or more types of the thermal radical polymerization initiators may be used in combination.

When the number average molar mass of the polymeric azo initiator is less than 1,000, the polymeric azo initiator may adversely affect the liquid crystal layer IC. In contrast, when the number average molar mass of the polymeric azo initiator exceeds 300,000, mixture with an acrylic resin or an epoxy resin may be difficult. Therefore, the number average molar mass of the polymeric azo initiator is desirably 1,000 or more, more desirably 5,000 or more, and even more desirably 10,000 or more. In addition, the number average molar mass is desirably 300,000 or less, more desirably 100,000 or less, and even more desirably 590,000 or less.

For example, polymeric azo initiators having a structure in which a plurality of units such as polyalkylene oxide and polydimethyl siloxane are bonded via an azo group can be used. As the polymeric azo initiator having a structure in which a plurality of units such as polyalkylene oxide are bonded via an azo group, for example, the polymeric azo initiator having a polyethylene oxide structure is desirable. For example, examples of such a polymeric azo initiator include a polycondensate of 4,4'-azobis (4-cyanopentanoic acid) and polyalkylene glycol, a polycondensate of polydimethyl siloxane having 4,4'-azobis (4-cyanopentanoic acid) and a terminal amino group, and the like. More specifically, examples of the polymeric azo initiator include, for example, VPE-0201, VPE-0401, VPE-0601, VPS-0501, and VPS-1001 (all manufactured by Wako Pure Chemical Industries, Ltd.) and the like. In addition, examples of azo initiators other than the polymeric azo initiator include, for example, V-40, V-59, V-65, V-501, V-601, VE-073, and AIBN (all manufactured by Wako Pure Chemical Industries, Ltd.) and the like.

As the above-mentioned organic peroxide, for example, ketone peroxide, peroxyketal, hydroperoxide, dialkyl peroxide, peroxyester, diacyl peroxide, peroxydicarbonate and the like can be used. Of these, peroxyester is preferred.

As peroxyesters, t-butylperoxy-2-ethylhexanoate, 1,1,3, 3-tetramethylbutylperoxy-2-ethylhexanoate, t-hexylperoxy-2-ethylhexanoate (all manufactured by NOF Corporation) and the like can be desirably used. A thermal radical polymerization initiator having a peroxyester skeleton represented by a peroxy-2-ethylhexanoate skeleton is desirable since the ten-hour half-life temperature Ta thereof is low.

For example, the content of the thermal radical polymerization initiator in the sealing member SE is 0.1 parts by weight or more and 30 parts by weight or less with respect to 100 parts by weight of the above-described curable resin containing an epoxy resin or an acrylic resin. If the content of the thermal radical polymerization initiator is less than 0.1 parts by weight, the polymerization of the sealing member SE may not proceed sufficiently. If the content of the thermal radical polymerization initiator exceeds 30 parts by weight, a large amount of unreacted thermal radical polymerization initiator remains and the weather resistance of the sealing member SE may be degraded. The content of the thermal radical polymerization initiator is desirably 1 party by weight or more. In addition, the content is desirably 10 parts by weight or less and, more desirably, 5 parts by weight or less.

In the embodiment, the thermal radical polymerization initiator has a ten-hour half-life temperature Ta of, for example, 95° C. or lower (Ta≤95° C.). The ten-hour half-life temperature Ta is desirably 90° C. or lower (Ta≤90° C.) and, more desirably, 80° C. or lower (Ta≤80° C.) and, much more desirably, 75° C. or lower (Ta≤75° C.). In addition, the ten-hour half-life temperature Ta is desirably 40° C. or higher (40° C.≤Ta) and, more desirably, 45° C. or higher (45° C.≤Ta).

The ten-hour half-life temperature of the compound is obtained by preparing a solution in which the compound to be measured is dissolved in an inert solvent (for example, toluene) so as to have a concentration of 0.1 mol/L, sealing the solution in a vessel, maintaining the solution at a predetermined temperature, thermally decomposing the compound to be measured, and measuring the relationship between the time and the change in the concentration of the compound to be measured at this time.

More specifically, first, the k value is calculated at a predetermined constant temperature based on the following equation, $$\ln(a/x)=kt \qquad [\text{Equation 1}]:$$

and a half life is obtained by substituting this value into $$t^{1/2}(\text{half life})=(\ln 2)/k \qquad [\text{Equation 2}]:$$

and a temperature at which the half life at the desired time obtained from the half lives at a plurality of temperatures is ten hours is calculated, and the ten-hour half-life temperature of the compound is thereby obtained. In Formula 1, a is the concentration. (mol/L) of the compound to be measured at time t, a is the initial concentration (mol/L) of the compound to be measured, and k is a decomposition rate constant determined by the temperature.

[Thermosetting Agent]

The thermosetting agent contained in the sealing member SE initiates addition polymerization in uncured epoxy resin by being heated. For example, as the thermosetting agent, an imidazole-based thermosetting agent, an amine-based thermosetting agent, a phenol-based thermosetting agent, a polythiol-based thermosetting agent, an acid anhydride, a thermal cation initiator, and the like can be used. One type of thermosetting agent may be used alone or two or more types of thermosetting agents may be used in combination.

For example, when an imidazole-based thermosetting agent, a polythiol-based thermosetting agent, or an amine-based thermosetting agent is used as the thermosetting agent, the epoxy resin can be cured more rapidly at a low temperature. In addition, when a latent thermosetting agent is used, storage stability increases when an epoxy resin and a thermosetting agent are mixed. Examples of the latent thermosetting agent include a latent imidazole-based thermosetting agent, a latent polythiol-based thermosetting agent, and a latent amine-based thermosetting agent. Incidentally, the thermosetting agent may be coated with a polymeric substance such as a polyurethane resin or a polyester resin.

For example, examples of the imidazole-based thermosetting agent include 2-methylimidazole, 2-ethyl-4-methylmidazole, 1-cyanoethyl-2-phenylimidazole, 1-cyanoethyl-2-phenylimidazolium trimellitate, 2,4-diamino-6-[2'-methylimidazolyl-(1')]-ethyl-s-triazine and 2,4-diamino-6-[2'-methylimidazolyl-(1')]-ethyl-s-triazine isocyanuric acid adducts, and the like.

For example, examples of the polythiols-based thermosetting agent include trimethylolpropane tris-3-mercaptopropionate, pentaerythritol tetrakis-3-mercaptopropionate, dipentaerythritol hexa-3-mercaptopropionate, and the like.

For example, examples of an amine-based thermosetting agent include hexamethylenediamine, octamethylenediamine, decamethylenediamine, 3,9-bis (3-aminopropyl)-2,4,8,10-tetraspiro [5,5] undecane, bis (4-aminocyclohexyl) methane, metaphenylenediamine, diaminodiphenylsulfone, and the like.

For example, examples of the thermal cation curing agent include an iodonium-based cation curing agent, an oxonium-based cation curing agent, a sulfonium-based cation curing agent, and the like. Examples of the iodonium-based cationic curing agent include bis (4-tert-butylphenyl) iodonium hexafluorophosphate, and the like. Examples of the oxonium-based cationic curing agent include trimethyloxonium tetrafluoroborate, and the like. Examples of the sulfonium-based cationic curing agent include tri-p-tolylsulfonium hexafluorophosphate, and the like.

In the present embodiment, the thermosetting agent has a reaction initiation temperature Tb (curing temperature) of, for example, 50° C. or more. The reaction initiation temperature Tb is desirably 70° C. or higher and, more desirably, 80° C. or higher. In addition, the reaction initiation temperature Tb is desirably 250° C. or lower, more desirably 200° C. or lower, and, even more desirably, 150° C. or lower. Incidentally, the reaction initiation temperature of the thermosetting agent means the temperature at which the rise of the exothermic peak initiates in a differential scanning calorimeter (DSC).

When the relationship between the ten-hour half-life temperature Ta of the thermal radical polymerization initiator and the reaction initiation temperature Tb of the thermosetting agent is focused, the reaction initiation temperature Tb is higher than the ten-hour half-life temperature Ta in the present embodiment (Ta<Tb). The reaction initiation temperature Tb is desirably higher than the ten-hour half-life temperature Ta by 15° C. or more (Ta+15° C.≤Tb). The thermal radical polymerization initiator and the thermosetting agent may be selected such that the ten-hour half-life temperature Ta and the reaction initiation temperature Tb belong to the above-described suitable temperature ranges, respectively, and that Ta<Tb and Ta+15° C.≤Tb are satisfied.

[Photo-Radical Polymerization Initiator]

The photo-radical polymerization initiator contained in the liquid crystal layer LC initiates radical polymerization in the liquid crystal layer LC by being irradiated with ultraviolet light. Although not particularly limited, for example, a benzophenone-based compound, an acetophenone-based compound, an acylphosphine oxide-based compound, a titanocene-based compound, an oxime ester-based compound, a benzoin ether-based compound, thioxanthone, and the like can be used as the photo-radical polymerization initiator. Only one photo-radical polymerization initiator may be used or two or more types of photo-radical polymerization initiators may be used together. Of these, acetophenone-based compounds, acylphosphine oxide-based compounds, and thioxanthone-based compounds are preferred.

[Polymerization Inhibitor]

The polymerization inhibitor contained in the liquid crystal layer LC suppresses polymerization in the quid crystal layer LC, caused by heat applied when the sealing member SE cured. Although not particularly limited, for example, hydroquinon-based compounds such as β-naphthoquinone, 2-methoxy-1,4-naphthoquinone, 4-methoxy-1-naphthol, methylhydroquinone, hydroquinone, p-methoxyphenol, mono-tert-butylhydroquinone, 2,5-di-tert-butylhydroquinone, p-benzoquinone, 2,5-diphenyl-p-benzoquinone, and 2,5-di-tert-butyl-p-benzoquinone can be used as the polymerization inhibitor. In addition, catechol-based compounds such as catechol and tert-butylcatechol, nitroso-based compounds such as N-nitrosophenylhydroxylamine ammonium salt and N-nitrosophenylhydroxylamine aluminum salt, and triphenylphosphine and pyrogallol may be used as the polymerization inhibitor. Only one polymerization inhibitor may be used or two or more types of polymerization inhibitors may be used together.

Next, an example of a method of manufacturing the display device DSP will be described with reference to a flowchart of FIG. 5. First, the first substrate SUB1 in which the scanning signal lines G, the video signal lines S, the first scanning line driver GD1, the second scanning line driver GD2, the switching elements SW, the pixel electrodes PE, the first alignment film 11, and the like are formed on the first transparent base 10 is manufactured. (first process P1). In addition, the second substrate SUB2 in which the common electrodes CE, the second alignment film 21, and the like are formed on the second transparent base 20 is manufactured (second process P2). For example, each of the first substrate SUB1 and the second substrate SUB2 may be formed on a mother glass of a large size. In this case, the first substrate SUB2 and the second substrate SUB2 are cut from a mother glass at appropriate timing after passing through each of processes P3 to P8 to be described later.

Next, the uncured sealing member SE is formed on one of the first substrate SUB1 and the second substrate SUB2 (third process P3). The sealing member SE can be formed in an annular shape by using, for example, a dispenser. In the embodiment, the sealing member SE does not comprise an inlet port since the ODF is adopted. That is, the sealing member SE has a seamless and continuous annular shape.

After the sealing member SE is formed, the liquid crystal material is dropped to the inside of the sealing member SE (fourth process P4). After that, the first substrate SUB1 and the second substrate SUB2 are bonded to each other by the sealing member SE in a vacuum (fifth process P5). The liquid crystal layer LC is thereby formed in the space surrounded by the first alignment film 11, the second alignment film 21, and the sealing member SE.

After the first substrate SUB1 and the second substrate SUB2 are bonded, a first thermosetting process of temporarily curing the sealing member SE (sixth process P6) and a second thermosetting process of substantially curing the sealing member SE (seventh process P7) are sequentially performed.

In the first thermosetting process, the sealing member SE is heated at a first temperature T1. The first temperature T1 is a temperature at which uncured acrylic resin contained in the sealing member SE is cured and may be set to be higher than, a ten-hour half-life temperature Ta of a thermal radical polymerization initiator. In the first thermosetting process, radical polymerization proceeds in the acrylic resin by the effect of the thermal radical polymerization initiator. Since the reaction rate of the radical polymerization is high, the acrylic resin can be cured for a short time.

In the second thermosetting process, the sealing member SE is heated at a second temperature T2 higher than the first temperature T1 (T1<T2). The second temperature T2 is a temperature at which uncured epoxy resin contained in the sealing member SE is cured, i.e., a temperature higher than or equal to a reaction initiation temperature Tb (Tb<T2) of the thermosetting agent in the second thermosetting process, addition polymerization proceeds in the epoxy resin by the effect of the thermosetting agent. Since the reaction rate of the addition polymerization is slower than the radical polymerization, the second thermosetting process can be performed for a longer time than the first thermosetting process.

If the epoxy resin is somewhat cured by the action of the thermosetting agent in the first thermosetting process, a by-product accompanying this reaction may be eluted into the liquid crystal layer LC and may deteriorate the display quality. Therefore, the first temperature T1 is desirably lower than the reaction initiation temperature Tb of the thermosetting agent (T1<Tb). When Ta+15° C.≤Tb is satisfied as described above, the difference between the first temperature T1 and the reaction initiation temperature Tb can be sufficiently secured, and the reaction of the epoxy resin and the elution of by-products into the liquid crystal layer LC in the first thermosetting process can be suitably suppressed, by setting the first temperature T1 to be close to the ten-hour half-life temperature Ta.

Since the second temperature T2 in the second thermosetting process is high and heat needs to be applied for a long time, the liquid crystal layer LC is likely to expand. When the liquid crystal layer LC expands, a load is applied to the sealing member SE. If the sealing member SE is thereby damaged or deformed or the sealing member SE and the first substrate SUB1 or the second substrate SUB2 are peeled, the liquid crystal material leaks out of the sealing member SE. In the present embodiment, however, the acrylic resin of the sealing member SE is cured by the first thermosetting process before the second thermosetting process. Accordingly, even if the liquid crystal layer LC is exposed to a high temperature for a long time in the second thermosetting process, damage, deformation, or peeling of the sealing member SE is unlikely to occur and leakage of the liquid crystal material can be thereby suppressed.

As described above, the liquid crystal layer LC contains the polymerization inhibitor. The polymerization of the liquid crystal monomer in the liquid crystal layer LC can be suppressed in each of the first thermosetting process and the second thermosetting process.

After the sealing member SE is cured, ultraviolet light is applied to the entire surface of the liquid crystal layer LC (eighth process P8). The ultraviolet light may be applied to the entire region of the liquid crystal panel PNL including the sealing member SE around the liquid crystal layer LC and the like or may be applied to the only liquid crystal layer LC, Since the liquid crystal layer LC contains the photoradical polymerization initiator, the liquid crystal monomer in the liquid crystal layer LC initiates polymerization by ultraviolet light. The ultraviolet light may be applied from the first substrate SUB1 side or the second substrate SUB2 side. Since the second substrate SUB2 includes less metal lines than the first substrate SUB1, the liquid crystal monomer can be efficiently polymerized by applying ultraviolet light from the second substrate SUB2 side. Incidentally, the photo-radical polymerization initiator is used for polymerization of the monomer in the liquid crystal layer LC. However, the invention is not limited to the aspect using this. As long as the monomer is polymerized, the other materials or polymerization methods may be used.

After the scattering liquid crystal layer IC is thus formed by applying ultraviolet light, cleaning and inspection of the liquid crystal panel PNL are performed. Furthermore, the light source LS, the first flexible printed circuit FPC1, the second flexible printed circuit FPC2, the controller CT and the like are mounted, and the display device DSP is completed. In the completed display device DSP, too, the sealing member SE contains a thermal radical polymerization initiator and a thermosetting agent. In addition, in the completed display device DSP, too, the liquid crystal layer LC contains a phot radical polymerization initiator and a polymerization inhibitor.

According to the display device DSP and the manufacturing method thereof such as the present embodiment, the liquid crystal layer LC is formed by the ODF method. Therefore, injection of the liquid crystal material does not take much time as compared with a case of employing the vacuum injection method, and the liquid crystal material does not enter the outside of the sealing member SE. In addition, the sealing member SE can be formed seamlessly without interruption. Thus, the time required for manufacturing the display device DSP can be reduced, and the display quality of the display device DSP can be improved.

When the sealing member SE is cured by ultraviolet light, polymerization may occur simultaneously in the liquid crystal layer LC. In contrast, in the present embodiment, the sealing member SE is cured by heat. Furthermore, the liquid crystal layer LC contains a polymerization inhibitor that suppresses polymerization caused by heat. They enable the polymerization in the liquid crystal layer LC to be suppressed during curing of the sealing member SE. The polymerization in the liquid crystal layer LC can be carried out in the eighth process P8 by apply ultraviolet light under optimal conditions for implementing the liquid crystal layer LC having desired characteristics.

Epoxy resin has a higher adhesive strength than acrylic resin. In contrast, the time required for curing the acrylic resin is shorter than that of the epoxy resin. In the present embodiment, the sealing member SE is formed by utilizing the characteristics of the acrylic resin and the epoxy resin. That is, inconvenience caused by the expansion of the liquid crystal layer LC is suppressed as described above by first curing the acrylic resin in a short time. Furthermore, a highly reliable display device DSP that is unlikely to cause peeling of the first substrate SUB1 and the second substrate SUB2 and deterioration of the sealing member SE over time is implemented by curing the epoxy resin for a long time after curing the acrylic resin.

Incidentally, if the sealing member SE is cured by ultraviolet light, the ultraviolet light can be blocked by a light-shielding portion such as a driver or metal line of the first substrate SUB1 or the second substrate SUB2, and the curing of the sealing member SE can be hindered. In contrast, when the sealing member SE is cured by heat similarly to the present embodiment, the sealing member SE is not affected by the light shielding portion.

Figure 6:
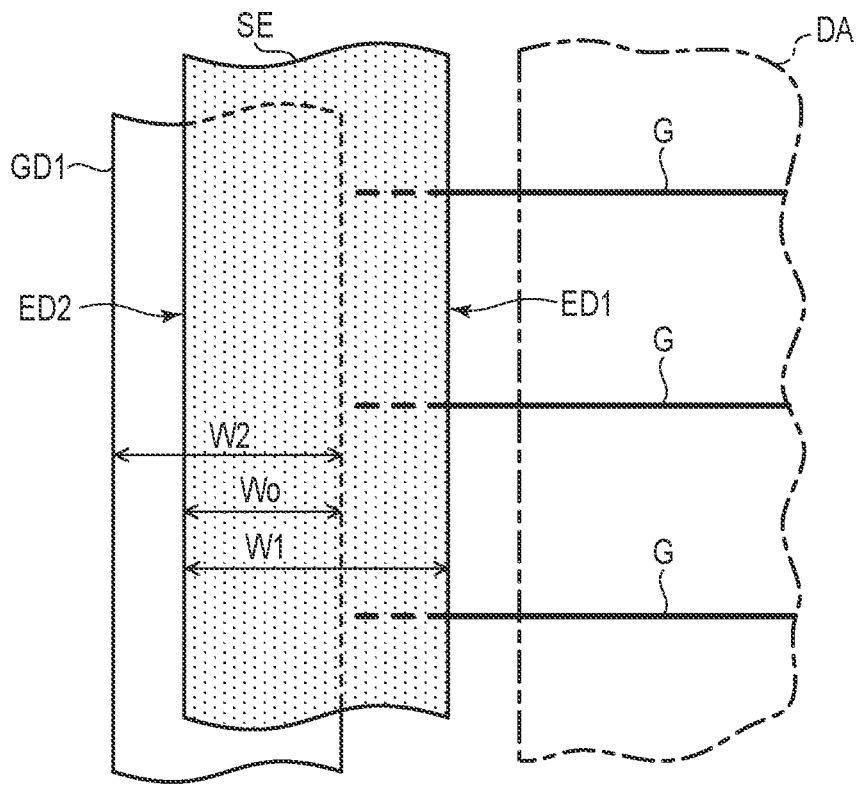
FIG. 6 is an enlarged plan view schematically showing parts of a sealing member, a scanning line driver, and a display area according to the embodiment.

An example of the relationship between the sealing member SE and the light-shielding portion will be described. FIG. 6 is an enlarged plan view showing parts of the sealing member SE, the first scanning line driver GD1, and the display area DA. The first scanning line driver GD1 is an example of a light-shielding unit and includes various metal lines. The sealing member SE has a first end ED1 and a second end ED2 in the width direction. In the example of FIG. 6, the first end ED1 is located between the first scanning line driver GD1 and the display area DA. The second end. ED2 is overlaid on the first scanning line driver GD1.

The sealing member SE has a first width W1. The first scanning line driver GD1 has a second width W2. In a case where the sealing member SE is cured by heat, the curing is not particularly affected even if the sealing member SE and the first scanning line driver GD1 are greatly overlaid. Therefore, a width. Wo of the region where the sealing member SE and the first scanning line driver GD1 are overlaid can be set to be, for example, 50% or more of the width W2. The width Wo may be 60% or more of the width W2, and may be 70% or more. In addition, the sealing member SE may be overlaid on the entire first scanning line driver GD1. A similar relationship of overlaying can also be applied to the second scanning line GD2.

Thus, since increase of the width Wo does not particularly affect the curing of the sealing member SE, the width W1 of the sealing member SE can be increased. The strength of the sealing member SE can be thereby increased, and the reliability of the display device DSP can be further improved. When it takes much time to cure the sealing member SE by increasing the width W1, the amount of the thermal radical polymerization initiator or the thermosetting agent may be increased or the thermal radical polymerization initiator in which the ten-hour half-life temperature Ta is extremely low or the thermosetting agent in which the reaction initiation temperature Tb is extremely low may be used.

Figure 7:
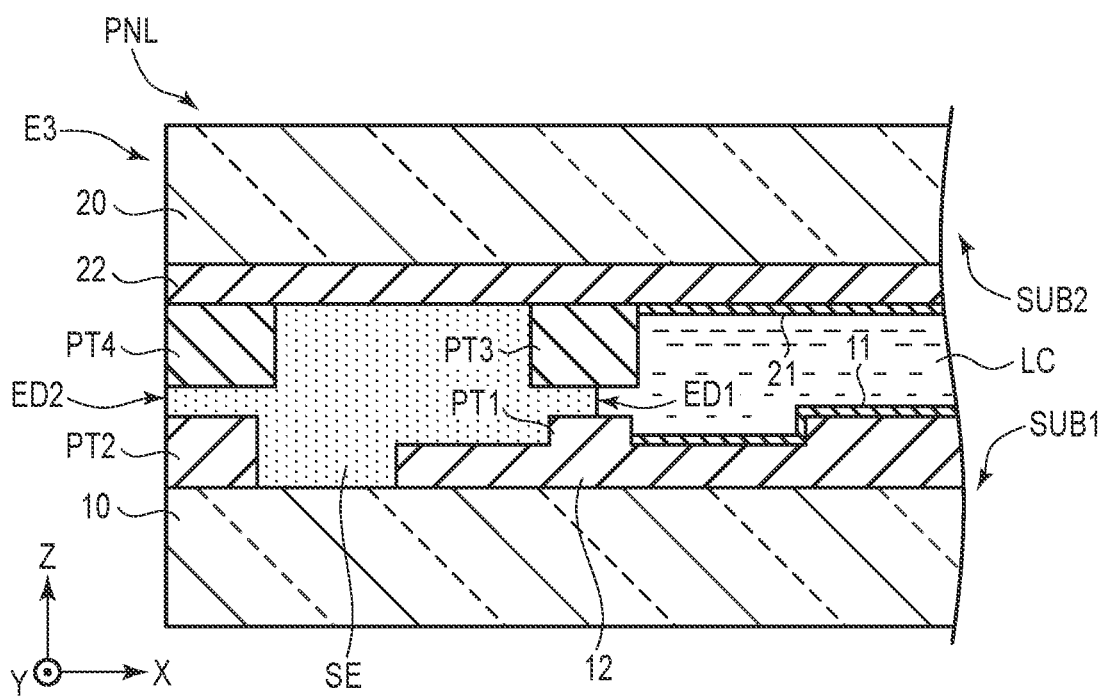
FIG. 7 is a schematic cross-sectional view showing a liquid crystal panel showing another example of the sealing member.

FIG. 7 is a schematic cross-sectional view of the liquid crystal panel PNL showing another example of the sealing member SE. In the example of this figure, the second end ED2 of the sealing member SE is located at the end on the third side E3 side of the liquid crystal panel PNL. Furthermore, the first substrate SUB1 comprises a first projection PT1 and a second projection PT2 projecting toward the second substrate SUB2, and the second substrate SUB2 comprises a third projection PT3 and a fourth projection projecting toward the first substrate SUB1.

The first protrusion PT1 is provided on, for example, a first insulating layer 12 formed between the first transparent base 10 and the first alignment film 11. The second protrusion PT2 is arranged on, for example, the first transparent base 10. The first protrusion PT1 and the second protrusion PT2 can be formed by patterning the first insulating layer 12 using, for example, a multi-tone mask. Another insulating layer may be interposed between the first insulating layer 12 and the first transparent base 10 or between the second protrusion PT2 and the first transparent base 10.

The third protrusion PT3 and the fourth protrusion PT4 are provided below, for example, a second insulating layer 22 formed between the second transparent base 20 and the second alignment film 21. The third protrusion PT3 and the fourth protrusion PT4 may be formed by patterning the second insulating layer 22 using a multi-tone mask.

In the example of FIG. 7, the first alignment film 11 is not formed in the region between the first protrusion PT1 and the third side E3. However, the first alignment film 11 may be formed in at least a part of this region. In addition, in the example of FIG. 7, the second alignment film 21 is not formed in the region between the third protrusion PT3 and the third side P3. However, the second alignment film 21 may be formed in at least a part of this region.

The first end PD1 is located between the first protrusion PT1 and the third protrusion P13. That is, the first end ED1 is overlaid on the first projection PT1 and the third projection PT3 in planar view. In such a structure, the area where the side surface of the sealing member SE at the first end ED1 is in contact with the liquid crystal layer LC is small. Therefore, for example, even if the liquid crystal layer LC expands in the above-described first thermosetting process or second thermosetting process, a load is less likely to be applied to the sealing member SE and damage or deformation of the sealing member SE can be suppressed. In addition, even if a by-product caused by curing the sealing member SE is generated, the by-product hardly elutes in the liquid crystal layer LC. The protrusion on which the first end ED1 is overlaid may be only one of the first protrusion P11 and the third protrusion PT3.

From the above viewpoint, the protrusion amount of the third protrusion PT3 (or the first protrusion PT1) is desirably larger than the gap between the third protrusion PT3 and the first protrusion PT1. In addition, the protrusion amount of the third protrusion PT3 (or the first protrusion PT1) is desirably 50% or more of the thickness of the liquid crystal layer IC in the display area CA.

The second end ED2 is located between the second protrusion PT2 and the fourth protrusion P14. That is, the second end ED2 is overlaid on the second protrusion PT2 and the third protrusion PT3 in planar view. In such a structure, the sealing member SE becomes thin between the second protrusion PT2 and the fourth protrusion PT4, Therefore, when the liquid crystal panel PNL is cut out from the mother glass, the cutting can easily be performed.

Incidentally, the liquid crystal panel PNL may include either of the first protrusion P11 and the third protrusion P13. In addition, the liquid crystal panel PNL may include either of the second protrusion PT2 and the fourth protrusion PT4. The same structure as that in the example of FIG. 7 can be applied to the first side E1, the second side E2, and the fourth side E4.

In addition to the above, various aspects can be applied to the planar shape of the sealing member SE and the cross-sectional structure of the liquid crystal panel PNL near the sealing member SE. In addition, the display device DSP can be manufactured by appropriately modifying the manufacturing method disclosed in the present embodiment. For example, the sealing member SE may contain a photo-radical polymerization initiator for curing the acrylic resin with ultraviolet light. In this case, for example, a process of applying ultraviolet light to the sealing member SE may be added before the first thermosetting process or instead of the second thermosetting process. The ultraviolet light desirably has a wavelength in a range (for example, 400 nm or more) excluding, for example, the wavelength at which polymerization initiates in the liquid crystal layer LC. The range of the wavelength at which the polymerization can initiate in the liquid crystal layer LC (for example, a predetermined region on the shorter wavelength side than the peak of the ultraviolet light) may be removed from the ultraviolet light by a cut filter.

All the liquid crystal panels and the electro-optical devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A liquid crystal panel comprising:
a first substrate;
a second substrate opposed to the first substrate;
a sealing member bonding the first substrate and the second substrate, the sealing member containing a thermal radical polymerization initiator and an acrylic resin, the thermal radical polymerization initiator having a ten-hour half-life temperature of 95° C. or lower;
a liquid crystal layer containing a macromolecular compound and being sealed between the first substrate and the second substrate by the sealing member; and
a light source emitting light for displaying an image,
wherein
the light emitted from the light source is incident on a side surface of the second substrate to propagate through the second substrate, the first substrate and the liquid crystal layer,
the liquid crystal layer is a scattering liquid crystal layer which scatters the light from the light source,
a background on the first substrate side can be visually recognized when the liquid crystal panel is viewed from the second substrate side,
a background on the second substrate side can be visually recognized when the liquid crystal panel is viewed from the first substrate side,
the sealing member is a sealing member which is used for an ODF method, and has a seamless and continuous annular shape surrounding a display area without interruption,
the ten-hour half-life temperature of the thermal radical polymerization initiator is 40° C. or higher and 80° C. or lower,
the sealing member further contains epoxy resin and a thermosetting agent,
a reaction initiation temperature of the thermosetting agent is higher than the ten-hour half-life temperature of the thermal radical polymerization initiator, and
the liquid crystal layer further contains a polymerization inhibitor suppressing polymerization of liquid crystal monomers caused by heat applied when the sealing member is cured, and a photo-radical polymerization initiator accelerating polymerization of the liquid crystal monomers by ultraviolet light.

2. The liquid crystal panel of claim 1, wherein
the reaction initiation temperature of the thermosetting agent is higher than the ten-hour half-life temperature of the thermal radical polymerization initiator by 15° C. or more.

3. The liquid crystal panel of claim 1, wherein
the thermosetting agent is an amine-based thermosetting agent.

4. The liquid crystal panel of claim 1, wherein
a reaction initiation temperature of the thermosetting agent is 50° C. or higher.

5. The liquid crystal panel of claim 1, further comprising:
a first protrusion protruding from one of the first substrate and the second substrate toward the other, wherein a first end of the sealing member on the liquid crystal layer side is overlaid on the first protrusion in planar view.

6. The liquid crystal panel of claim 5, further comprising:
a second protrusion protruding from one of the first substrate and the second substrate toward the other,
wherein a second end on a side opposite to the first end of the sealing member is overlaid on the second protrusion in planar view.

7. The liquid crystal panel of claim 5, further comprising:
a third protrusion opposed to the first protrusion at a position between the first substrate and the second substrate,
wherein a protrusion amount of the third protrusion is larger than a gap between the third protrusion and the first protrusion.

8. The liquid crystal panel of claim 1, wherein
a content of the thermal radical polymerization initiator in the sealing member is 0.1 parts by weight or more relative to 100 parts by weight of a thermosetting resin containing the acrylic resin.

9. The liquid crystal panel of claim 1, wherein
a content of the thermal radical polymerization initiator in the sealing member is 30 parts by weight or less relative to 100 parts by weight of a thermosetting resin containing the acrylic resin.

10. The liquid crystal panel of claim 1, wherein
the first substrate comprises a plurality of switching elements arranged inside the sealing member, and a driver controlling the plurality of switching elements,
the driver is overlaid on the sealing member in planar view, and
a width of a region where the driver and the sealing member are overlaid is 50% or more of a width of the driver.

11. The liquid crystal panel of claim 1, wherein
the thermal radical polymerization initiator has a peroxyester skeleton or is an azo-based polymer having a number average molar mass of 1,000 or more.

12. The liquid crystal panel of claim 11, wherein
a number average molar mass of the thermal radical polymerization initiator is 300,000 or less.

* * * * *